United States Patent
Pribble et al.

(10) Patent No.: US 12,051,258 B2
(45) Date of Patent: *Jul. 30, 2024

(54) IMAGE PROCESSING TO DETECT A RECTANGULAR OBJECT

(71) Applicant: Capital One Services, LLC, McLean, VA (US)

(72) Inventors: Jason Pribble, McLean, VA (US); Nicholas Capurso, Tysons Corner, VA (US); Daniel Alan Jarvis, Alexandria, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/321,131

(22) Filed: May 22, 2023

(65) Prior Publication Data
US 2023/0298375 A1 Sep. 21, 2023

Related U.S. Application Data

(63) Continuation of application No. 17/821,243, filed on Aug. 22, 2022, now Pat. No. 11,682,225, which is a (Continued)

(51) Int. Cl.
*G06K 9/00* (2022.01)
*G06V 10/20* (2022.01)
(Continued)

(52) U.S. Cl.
CPC ............ *G06V 30/414* (2022.01); *G06V 10/20* (2022.01); *G06V 10/25* (2022.01); *G06V 10/247* (2022.01)

(58) Field of Classification Search
CPC .... G06V 10/243; G06V 10/20; G06V 10/245; G06V 10/25; G06V 10/34; G06V 10/457; G06V 30/414; G06V 10/247
See application file for complete search history.

(56) References Cited

U.S. PATENT DOCUMENTS 5,666,441 A * 9/1997 Rao ................... G06V 10/757
382/199
6,049,636 A * 4/2000 Yang ................... G06T 7/73
382/293
(Continued)

FOREIGN PATENT DOCUMENTS

CN 105117680 A * 12/2015
CN 105139378 A * 12/2015
(Continued)

OTHER PUBLICATIONS

Rectification of perspective Text Images on Rectangular Planes, Huy Phat Le et al., International Journal of Contents, vol. 6, No. 4, Dec. 2010, pp. 1-7 (Year: 2010).*
(Continued)

*Primary Examiner* — Jayesh A Patel
(74) *Attorney, Agent, or Firm* — Harrity & Harrity, LLP

(57) ABSTRACT

In some implementations, a device may detect edges in an image, and may identify, based on the edges, a rectangle that bounds a document in the image. The device may detect lines in the image, and may identify edge candidate lines by discarding one or more of the lines. The device may identify intersection points where lines, included in the edge candidate lines, intersect with one another. The device may identify corner candidate points by discarding one or more points included in the intersection points, and may identify a corner point included in the corner candidate points. The corner point may be a point, included in the corner candidate points, that is closest to one corner of the bounding rectangle. The device may perform perspective correction on the image of the document based on identifying the corner point.

20 Claims, 11 Drawing Sheets

Related U.S. Application Data continuation of application No. 17/249,624, filed on Mar. 8, 2021, now Pat. No. 11,423,633, which is a continuation of application No. 16/443,038, filed on Jun. 17, 2019, now Pat. No. 10,943,140, which is a continuation of application No. 16/165,794, filed on Oct. 19, 2018, now Pat. No. 10,331,966.

(51) Int. Cl.
*G06V 10/25* (2022.01)
*G06V 30/414* (2022.01)
*G06V 10/24* (2022.01)

(56) References Cited

U.S. PATENT DOCUMENTS

| | | | | |
|---|---|---|---|---|
| 6,057,851 | A * | 5/2000 | Luken | G06T 15/04 345/586 |
| 6,853,751 | B1 * | 2/2005 | Milligan, Jr. | G06V 10/443 382/209 |
| 6,956,587 | B1 * | 10/2005 | Anson | H04N 1/3878 345/620 |
| 7,006,707 | B2 | 2/2006 | Peterson et al. | |
| 7,708,205 | B2 | 5/2010 | Kotlarsky et al. | |
| 7,990,412 | B2 * | 8/2011 | Jacobsen | H04N 5/772 348/44 |
| 8,230,640 | B2 * | 7/2012 | Meroney | A01K 85/16 43/42.3 |
| 8,238,640 | B2 * | 8/2012 | Sun | H04N 17/04 382/141 |
| 8,265,422 | B1 * | 9/2012 | Jin | H04N 25/61 348/580 |
| 8,320,615 | B2 * | 11/2012 | Hamza | G06T 7/74 382/103 |
| 8,411,998 | B2 * | 4/2013 | Huggett | G06T 3/00 382/296 |
| 8,837,833 | B1 * | 9/2014 | Wang | G06V 30/1478 382/182 |
| 9,253,349 | B2 * | 2/2016 | Amtrup | H04N 23/64 |
| 9,349,063 | B2 | 5/2016 | Smith et al. | |
| 9,367,736 | B1 * | 6/2016 | Senechal | G06V 30/40 |
| 9,390,342 | B2 * | 7/2016 | Campbell | G06V 10/24 |
| 9,672,510 | B2 * | 6/2017 | Roach | G06Q 20/3223 |
| 9,710,702 | B2 * | 7/2017 | Nepomniachtchi | G07C 9/00 |
| 10,331,966 | B1 * | 6/2019 | Pribble | G06V 30/414 |
| 10,719,937 | B2 * | 7/2020 | Zagaynov | G06V 10/243 |
| 10,943,140 | B2 * | 3/2021 | Pribble | G06V 10/20 |
| 11,423,633 | B2 * | 8/2022 | Pribble | G06V 30/414 |
| 11,682,225 | B2 * | 6/2023 | Pribble | G06V 10/20 382/199 |
| 2003/0165258 | A1 * | 9/2003 | Kubota | G06T 7/12 382/199 |
| 2004/0202385 | A1 * | 10/2004 | Cheng | G06V 10/32 382/305 |
| 2009/0087087 | A1 * | 4/2009 | Palum | G06T 3/4015 382/165 |
| 2009/0257658 | A1 * | 10/2009 | Fukunaga | H04N 1/3873 382/199 |
| 2010/0156919 | A1 * | 6/2010 | Bala | G09G 5/28 345/582 |
| 2010/0302594 | A1 * | 12/2010 | Chapman | G06T 11/60 358/1.18 |
| 2011/0007970 | A1 * | 1/2011 | Saund | G06V 30/413 382/176 |
| 2011/0032570 | A1 * | 2/2011 | Imaizumi | H04N 1/3878 358/1.15 |
| 2011/0052054 | A1 * | 3/2011 | Wu | H04N 23/80 382/167 |
| 2011/0052570 | A1 * | 3/2011 | Klagsbrun | A61P 35/00 530/389.7 |
| 2011/0123114 | A1 * | 5/2011 | Hwang | G06V 30/414 382/176 |
| 2011/0285873 | A1 * | 11/2011 | Showering | H04N 5/772 382/190 |
| 2013/0121594 | A1 * | 5/2013 | Kawatani | H04N 1/387 382/199 |
| 2013/0155474 | A1 * | 6/2013 | Roach | G06V 10/243 358/473 |
| 2013/0182002 | A1 * | 7/2013 | Macciola | G06V 10/25 345/589 |
| 2014/0050409 | A1 * | 2/2014 | Constantinou | G06V 30/142 382/195 |
| 2014/0126811 | A1 * | 5/2014 | Ihara | G06V 10/44 382/165 |
| 2014/0201126 | A1 * | 7/2014 | Zadeh | A61B 5/165 706/52 |
| 2015/0178903 | A1 * | 6/2015 | Maeno | G06T 5/80 382/275 |
| 2015/0317529 | A1 * | 11/2015 | Zhou | G06V 30/1444 382/190 |
| 2016/0104290 | A1 * | 4/2016 | Patnaik | G06F 18/24 382/173 |
| 2016/0125613 | A1 * | 5/2016 | Shustorovich | G06V 10/242 382/140 |
| 2016/0132744 | A1 * | 5/2016 | Choi | G06V 30/414 382/173 |
| 2016/0283787 | A1 * | 9/2016 | Nepomniachtchi | G06V 30/166 |
| 2017/0039420 | A1 * | 2/2017 | Wang | G06V 30/416 |
| 2019/0035061 | A1 * | 1/2019 | Ma | G06T 5/70 |
| 2020/0364875 | A1 * | 11/2020 | Mondal | G06T 5/70 |
| 2022/0392184 | A1 | 12/2022 | Pribble et al. | |

FOREIGN PATENT DOCUMENTS

| | | | | |
|---|---|---|---|---|
| CN | 105550633 | A * | 5/2016 | G06K 9/00442 |
| CN | 106250894 | A * | 12/2016 | G06K 9/3275 |
| CN | 106446893 | A * | 2/2017 | |
| CN | 106446893 | A | 2/2017 | |
| CN | 104268864 | B * | 4/2017 | G06T 7/13 |
| CN | 104217444 | B * | 6/2018 | |
| EP | 686932 | A2 * | 12/1995 | G06K 9/4638 |
| EP | 1944731 | A2 * | 7/2008 | G06T 7/12 |
| EP | 2388735 | A2 * | 11/2011 | G06K 9/033 |
| EP | 3163503 | A1 * | 5/2017 | G06K 9/00442 |
| JP | 2014503862 | A * | 2/2014 | |
| JP | 2014503862 | A | 2/2014 | |
| WO | WO-2013028477 | A1 * | 2/2013 | G06T 7/0083 |

OTHER PUBLICATIONS

Credit Card Processing Using Cell Phone Images, Keshav Datta, Feb. 8, 2016, pp. 3-9 (Year: 2016).*
Datta K., "Credit Card Processing Using Cell Phone Images," Feb. 8, 2016, pp. 3-9.
Le H.P., et al., "Rectification of Perspective Text Images on Rectangular Planes," International Journal of Contents, Dec. 2010, vol. 6 (4), pp. 1-7.

* cited by examiner

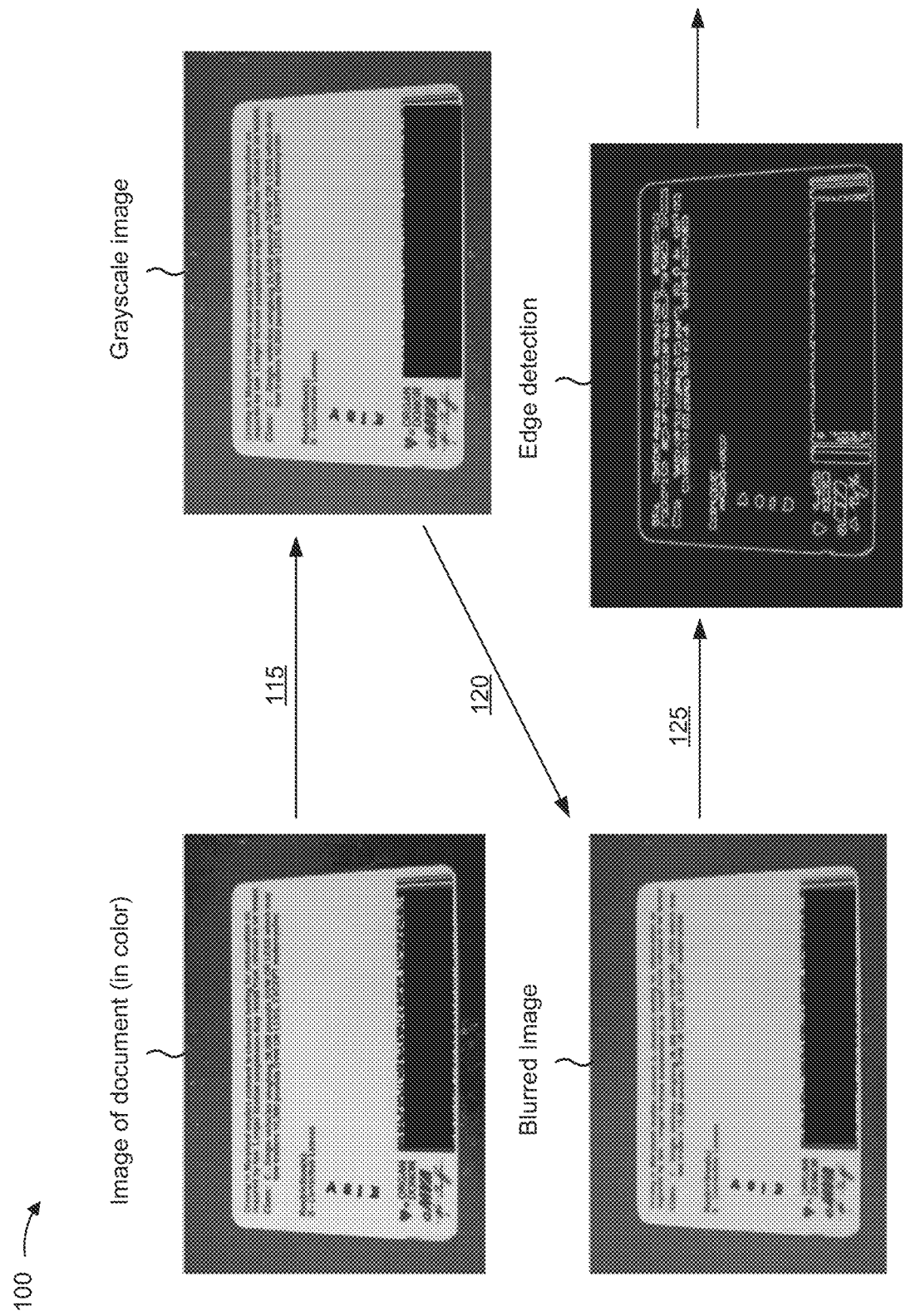

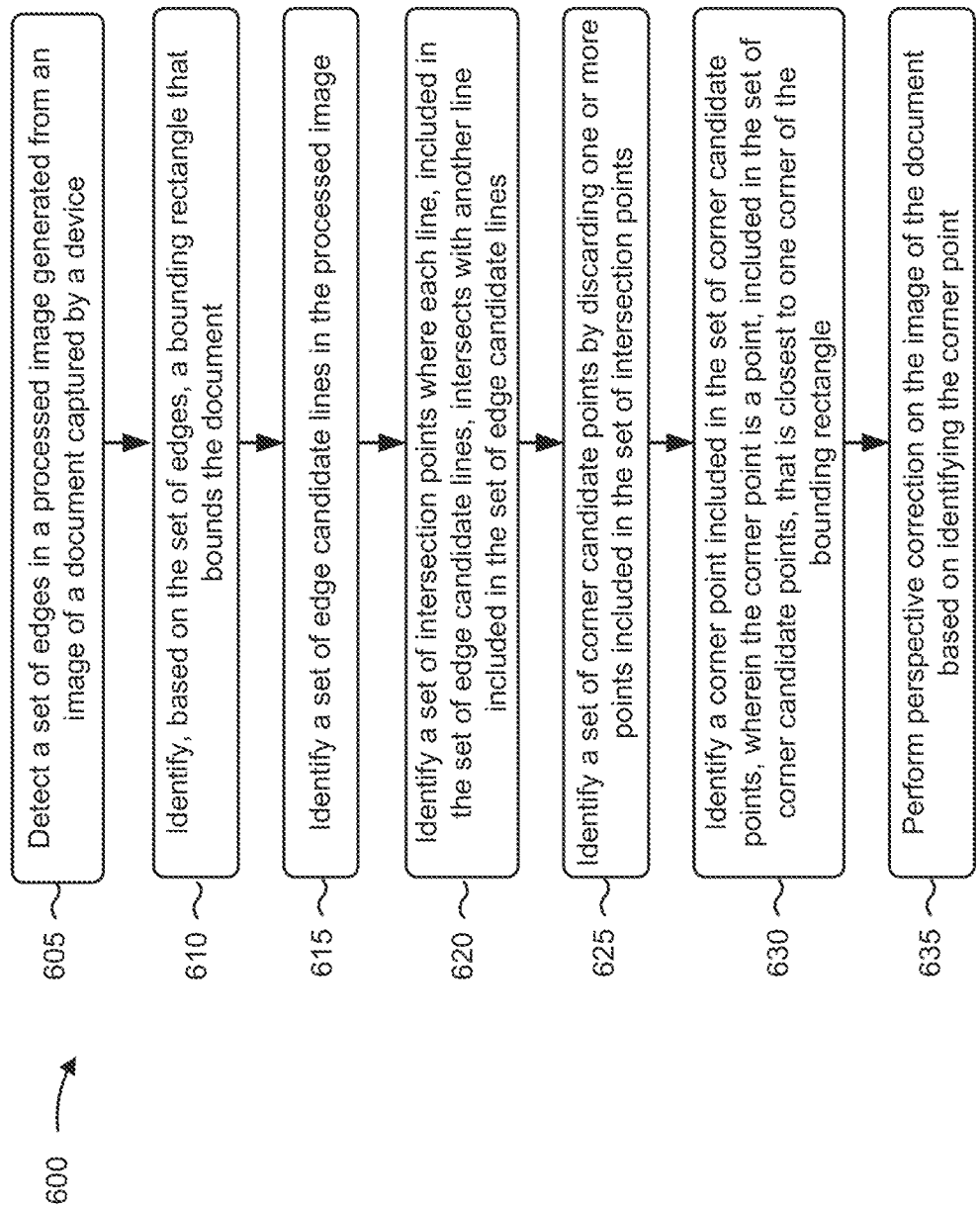

IMAGE PROCESSING TO DETECT A RECTANGULAR OBJECT

RELATED APPLICATIONS

This application is a continuation of U.S. patent application Ser. No. 17/821,243, filed Aug. 22, 2022, which is a continuation of U.S. patent application Ser. No. 17/249,624, filed Mar. 8, 2021 (now U.S. Pat. No. 11,423,633), which is a continuation of U.S. patent application Ser. No. 16/443,038, filed Jun. 17, 2019 (now U.S. Pat. No. 10,943,140), which is a continuation of U.S. patent application Ser. No. 16/165,794, filed Oct. 19, 2018 (now U.S. Pat. No. 10,331,966), the contents of which are incorporated herein by reference in their entireties.

BACKGROUND

Image processing may refer to any form of processing for which the input is an image or a series of images or videos, such as photographs or frames of video. The output of image processing can be another image or a set of characteristics or parameters related to the image.

SUMMARY

According to some possible implementations, a method may include obtaining, by a device, an image of a document using a camera of the device; detecting, by the device, a set of edges in the image; identifying, by the device and based on the set of edges, a bounding rectangle that includes the document; detecting, by the device, a set of lines in the image; removing, by the device, one or more lines from the set of lines to generate, from a remaining set of lines, a set of edge candidate lines; identifying, by the device, a set of intersection points where lines, included in the set of edge candidate lines, intersect with one another; removing, by the device, one or more points from the set of intersection points to generate, from a remaining set of intersection points, a set of corner candidate points; identifying, by the device, four corner points, included in the set of corner candidate points, that are closest to a respective four corners of the bounding rectangle that includes the document; and marking, by the device, the four corner points as corners of the document.

According to some possible implementations, a device may include an image capture component; one or more memories; and one or more processors, communicatively coupled to the one or more memories, to: obtain an image of a document from the image capture component; detect multiple edges in the image; identify, based on the multiple edges, a rectangle that bounds the document; detect multiple lines in the image; identify multiple edge candidate lines by discarding one or more lines of the multiple lines; identify intersection points where each line, of the multiple edge candidate lines, intersects with another line of the multiple edge candidate lines; identify multiple corner candidate points by discarding one or more points of the intersection points; identify four corner points of the multiple corner candidate points, wherein each corner point, of the four corner points, is closest to a respective corner of the rectangle that bounds the document; and perform perspective correction on the image of the document based on identifying the four corner points.

According to some possible implementations, a non-transitory computer-readable medium may store one or more instructions that, when executed by one or more processors of a device, cause the one or more processors to: detect a set of edges in a processed image generated from an image of a document captured by the device; identify, based on the set of edges, a bounding rectangle that bounds the document; detect a set of lines in the processed image; identify a set of edge candidate lines by discarding one or more lines included in the set of lines; identify a set of intersection points where each line, included in the set of edge candidate lines, intersects with another line included in the set of edge candidate lines; identify a set of corner candidate points by discarding one or more points included in the set of intersection points; identify a corner point included in the set of corner candidate points, wherein the corner point is a point, included in the set of corner candidate points, that is closest to one corner of the bounding rectangle; and perform perspective correction on the image of the document based on identifying the corner point.

BRIEF DESCRIPTION OF THE DRAWINGS

FIGS. 1A-1F are diagrams of an example implementation described herein.

FIGS. 4-6 are flow charts of example processes for image processing to detect a rectangular object.

DETAILED DESCRIPTION

Figure 1A:
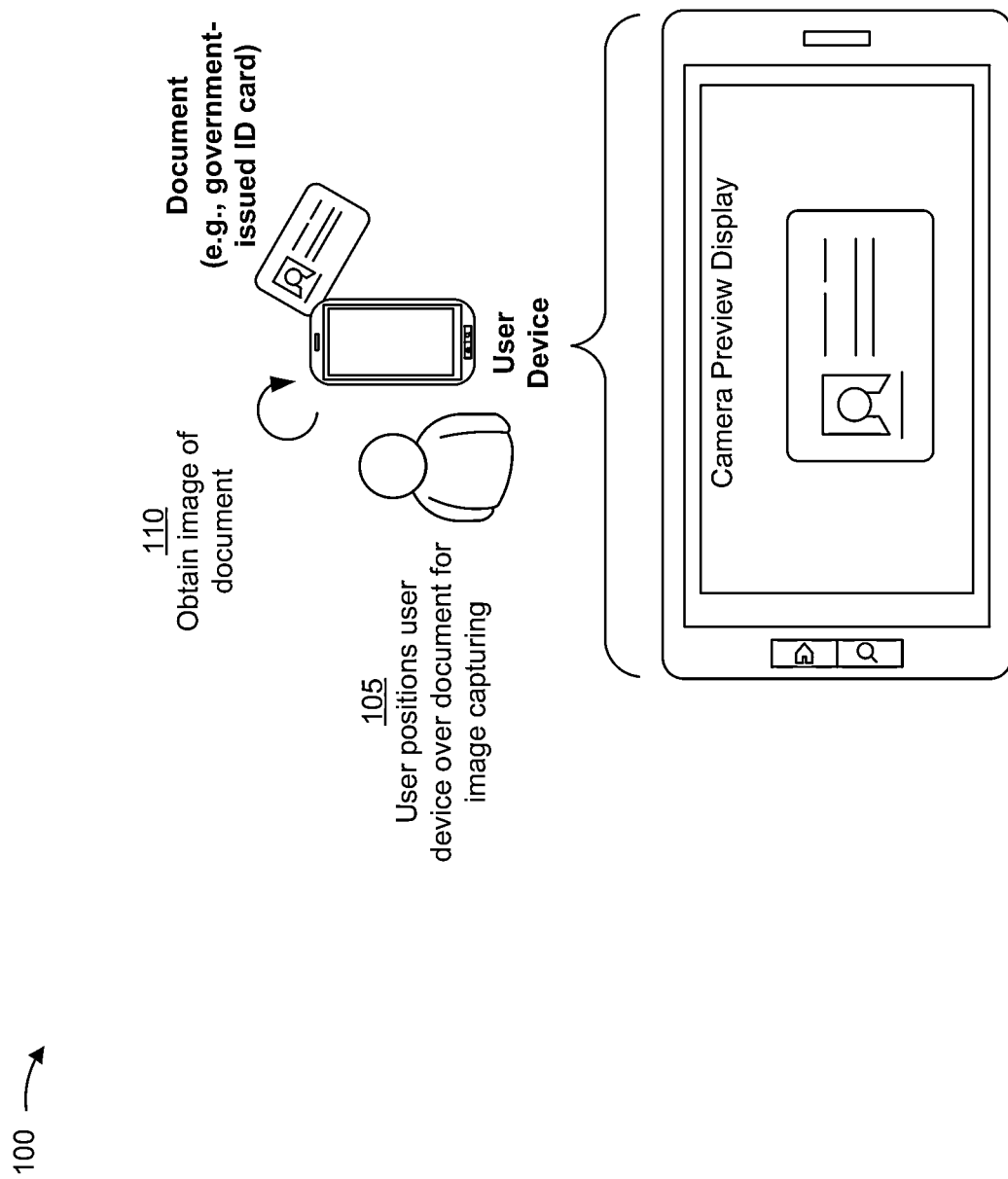

The following detailed description of example implementations refers to the accompanying drawings. The same reference numbers in different drawings may identify the same or similar elements.

Some entities (e.g., financial institutions, banks, vehicle rental agencies, service providers, and/or the like) permit account applicants, or customers, to capture images of verification documentation (e.g., government-issued identification (ID) cards, transaction cards, credit cards, debit cards, insurance cards, and/or the like) using a user device (e.g., a smart phone and/or the like), and submit the images over the Internet for validation. However, this can often be a frustrating process for a user, particularly if an entity's backend platform repeatedly rejects uploaded images for not meeting certain image quality standards, or not complying with a certain format. To assist with capturing an accurate image that complies with such image quality standards, the image may be analyzed and/or processed by the user device in real-time (or near real-time) as the image is being captured and/or viewed.

For example, to improve accuracy and increase uniformity of captured documents, such as cards, the user device may perform perspective correction, which may include tilt correction to correct for an image of a tilted document, rotation correction to correct for an image of a rotated document, and/or the like. The output of such processing may be an image that includes only the document (e.g., a rectangular object of interest), without any space around the document, which may improve further processing by removing portions of the image that may be interpreted incorrectly or may lead to errors in processing. Performing perspective correction of a rectangular document may require detection of the four corners of the document. However, some documents, such as ID cards or other types of cards, may have rounded corners, which makes automatic corner detection using image processing more difficult.

Some systems and methods described herein permit more accurate corner detection of a document with rounded corners (e.g., an ID card, a transaction card, an insurance card, and/or the like), which permits more accurate perspective correction and a truer representation of the document in a captured image. Furthermore, some systems and methods described herein permit such corner detection to be performed quickly (e.g., with a short processing time), which permits such corner detection to be performed in real-time (or near real-time) as an image of the document is being captured by the user device, which assists with determining when to trigger auto-capture of the image by the user device. Furthermore, a more accurate representation of the document (e.g., due to a more accurate determination of the corners and/or edges of the document) may result in less processing by a backend system, less processing at the user device due to fewer transmission attempts of inaccurate representations, and may conserve network resources due to transmitting multiple instances of a poorly captured document. Additional details are described below.

FIGS. 1A-1F are diagrams of an example implementation 100 described herein. Example implementation 100 may include a user device (e.g., a mobile device, such as a smart phone and/or the like) and a document. As shown, the document may include, for example, a government-issued identification (ID) card, an employee identification card, an insurance card, a transaction card (e.g., a credit card, a debit card, an automated teller machine (ATM) card, and/or the like), a check, and/or the like. In some implementations, the user device may include an image capture component, such as a camera (e.g., one or more cameras), configured to capture an image. Additionally, or alternatively, the user device may include one or more applications (e.g., provided by, or associated with, an entity, such as a financial institution) capable of facilitating image capture (e.g., using auto-capture and/or the like).

As shown in FIG. 1A, and by reference number 105, a user may position the user device over the document for image capturing. In some implementations, the user device may include a user interface configured to display a live preview image of the document being captured. As shown by reference number 110, the user device (e.g., based on programmed instructions, based on input from the user, and/or the like) may obtain a real-time (or near real-time) image of the document. For example, the user device may obtain the image using an image capture component of the user device, a camera of the user device, and/or the like. The image may be obtained or observed by the user device (e.g., a preview image), captured (e.g., via auto-capture when a set of conditions is satisfied, manually captured via user input triggering image capture, and/or the like), and processed after such capture. In some implementations, the techniques described herein may be used to determine whether and/or when to trigger auto-capture of the image. Additionally, or alternatively, the techniques described herein may be applied after the image is captured (e.g., as post-capture processing).

As shown in FIG. 1B, the obtained image of the document may initially be a color image. As shown by reference number 115, the user device may convert the color image to a grayscale image. As shown by reference number 120, the user device may generate a blurred image from the grayscale image, such as by applying one or more image blurring techniques. For example, the user device may apply a median blur technique to reduce noise in the image while keeping edges sharp. As shown by reference number 125, the user device may detect a set of edges in the image (e.g., in the blurred image). For example, the user device may apply one or more edge detection techniques to detect the set of edges, such as Canny edge detection and/or the like.

Figure 1C:
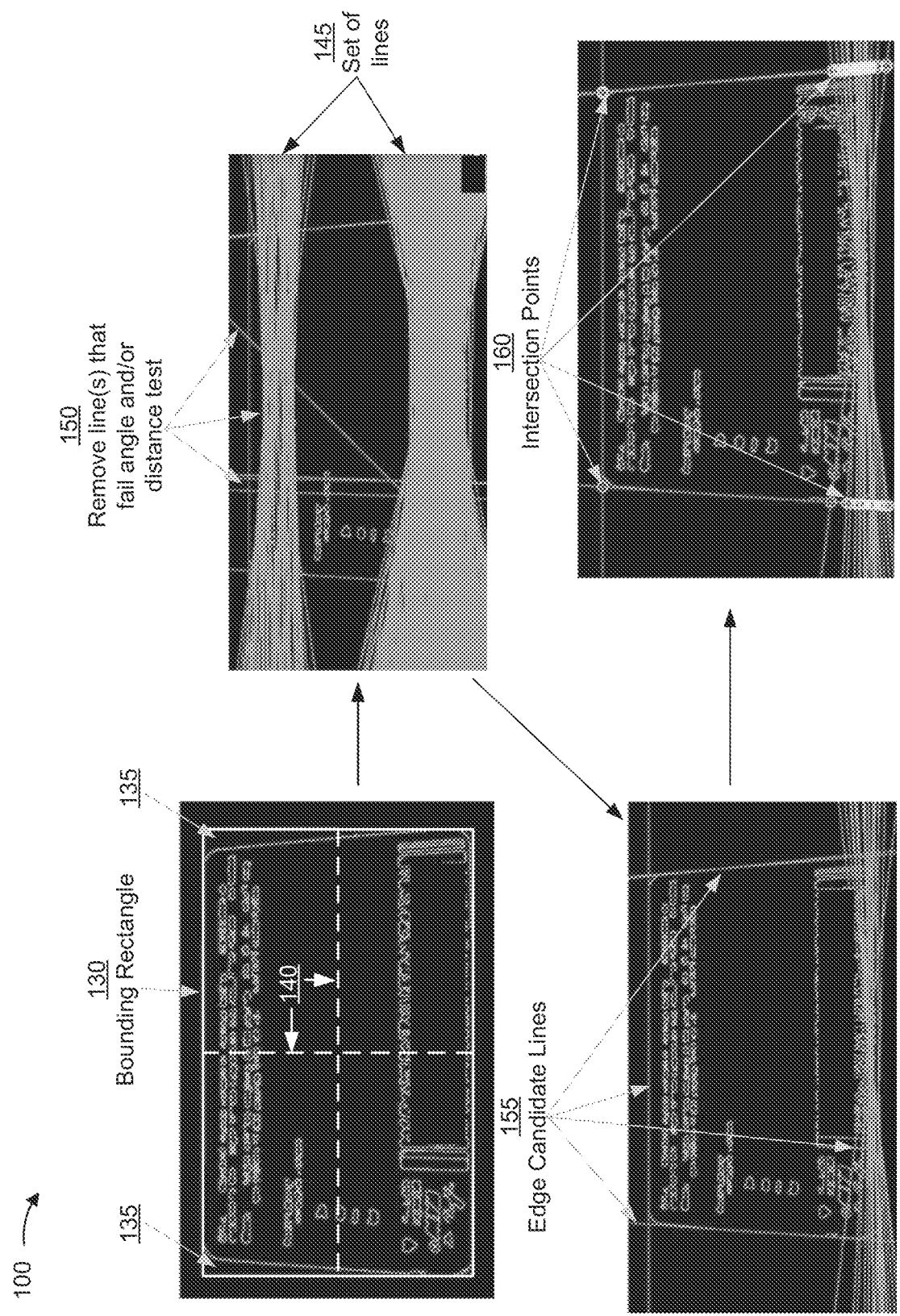

As shown in FIG. 1C, and by reference number 130, the user device may identify a bounding rectangle that includes (e.g., contains) the document within the image. In some implementations, the user device may identify the bounding rectangle based on the detected set of edges. For example, the user device may apply one or more bounding rectangle detection techniques, such as to obtain a straight bounding rectangle (e.g., that does not consider rotation of a rectangle to obtain a rectangle of minimum area that bounds the document), a rotated bounding rectangle (e.g., that considers rotation of a rectangle to obtain a rectangle of minimum area that bounds the document), and/or the like. In some implementations, the user device may apply a rotated bounding rectangle technique to improve accuracy and obtain a truer representation of the document in the image. As shown by reference number 135, the edges of the bounding rectangle may not correspond exactly to the edges of the document in the image, such as if the image is not captured at an exactly perpendicular angle, due to skew, tilt, and/or the like. Systems and methods described herein may correct this inaccuracy.

In some implementations, the user device may generate midpoint intersection lines of the bounding rectangle, as shown by reference number 140. For example, the user device may generate a first midpoint intersection line that connects the midpoints of the left and right edges of the bounding rectangle. Additionally, or alternatively, the user device may generate a second midpoint intersection line that connects the midpoints of the top and bottom edges of the bounding rectangle. Thus, a first midpoint intersection line (sometimes referred to as a first midpoint line) may connect midpoints of a first pair of opposite edges of the bounding rectangle (e.g., the left and right edges), and the second midpoint intersection line (sometimes referred to as a second midpoint line) may connect midpoints of a second pair of opposite edges of the bounding rectangle (e.g., the top and bottom edges). These midpoint intersection lines may be used to filter detected lines to determine a set of edge candidate lines, as described in more detail below. This may improve the accuracy of the captured image of the document, may ensure that conditions for auto-capture are satisfied with greater accuracy (e.g., a higher likelihood that the captured image will be acceptable when auto-captured), may provide a more accurate representation of the document when processing the image after the image is captured, and/or the like.

As shown by reference number 145, the user device may detect a set of lines in the image (e.g., in the blurred image). For example, the user device may apply one or more line detection techniques, such as a Hough transform, a Hough line detection technique, and/or another type of feature or line extraction technique. As shown by reference number 150, the user device may apply one or more line filtering techniques to remove one or more lines from the set of lines. The one or more lines may be removed to generate a set of edge candidate lines (e.g., from the remaining set of unremoved lines) that are more likely to represent the edges of the document than the removed lines. In some implementations, the user device may use the bounding rectangle and/or the midpoint intersection lines (described above) to generate the set of edge candidate lines.

In some implementations, the user device may remove lines that fail an angle test. For example, the user device may generate midpoint intersection lines of the bounding rectangle, as described above, and may remove lines that are not within a threshold angle (e.g., 5 degrees, 7.5 degrees, 10 degrees, and/or the like) of one or both of the midpoint intersection lines.

Additionally, or alternatively, the user device may remove lines that fail a distance test. For example, the user device may determine a midpoint of each edge of the bounding rectangle, and may remove lines with midpoints that are not within a threshold distance of one of the midpoints of an edge of the bounding rectangle (e.g., an end of a midpoint intersection lines). In some implementations, when determining a midpoint of a detected line, the user device may set the end points of the detected line to be the points where the detected line intersects with the bounding rectangle, and may determine the midpoint between those end points. In some implementations, the threshold distance may be based on a length of an edge of the bounding rectangle (e.g., a percentage of the length of the edge, such as 4%, 5%, 6%, and/or the like). In some implementations, the edge used to determine the threshold may be an edge (or a pair of edges) that is more perpendicular to the detected line than the other edges. Alternatively, the edge used to determine the threshold may be an edge (or a pair of edges) that is more perpendicular to the detected line than the other edges.

Additionally, or alternatively, the user device may determine a minimum distance between the midpoint of a detected line to a midpoint intersection line (e.g., the midpoint intersection line that is more perpendicular to the detected line than the other midpoint intersection line). If the minimum distance does not satisfy a threshold, then the user device may remove the detected line from the set of lines. In a similar manner as described above, the threshold may be determined based on an edge of the bounding rectangle. The user device may perform one or more of the angle tests and/or distance tests described above on each of the detected lines in the set of lines, and the remaining lines in the set (e.g., after removing lines that do not satisfy the angle test, the distance test, and/or another type of test) may represent a set of edge candidate lines. This may improve the accuracy of the captured image of the document, and may conserve processing resources due to needing to process fewer lines (e.g., no further processing of the removed lines is needed). Additionally, or alternatively, this may ensure that conditions for auto-capture are satisfied with greater accuracy (e.g., a higher likelihood that the captured image will be acceptable when auto-captured), may provide a more accurate representation of the document when processing the image after the image is captured, and/or the like.

As shown by reference number 155, after removing one or more lines from the set of detected lines, the lines remaining in the set may represent a set of edge candidate lines. These edge candidate lines may be more likely to represent an edge of the document than the lines that were removed from the set of lines for failing one or more tests.

As shown by reference number 160, the user device may identify a set of intersection points where lines, included in the set of edge candidate lines, intersect with one another. For example, the set of intersection points may represent all intersections between all of the lines included in the set of edge candidate lines.

Figure 1D:
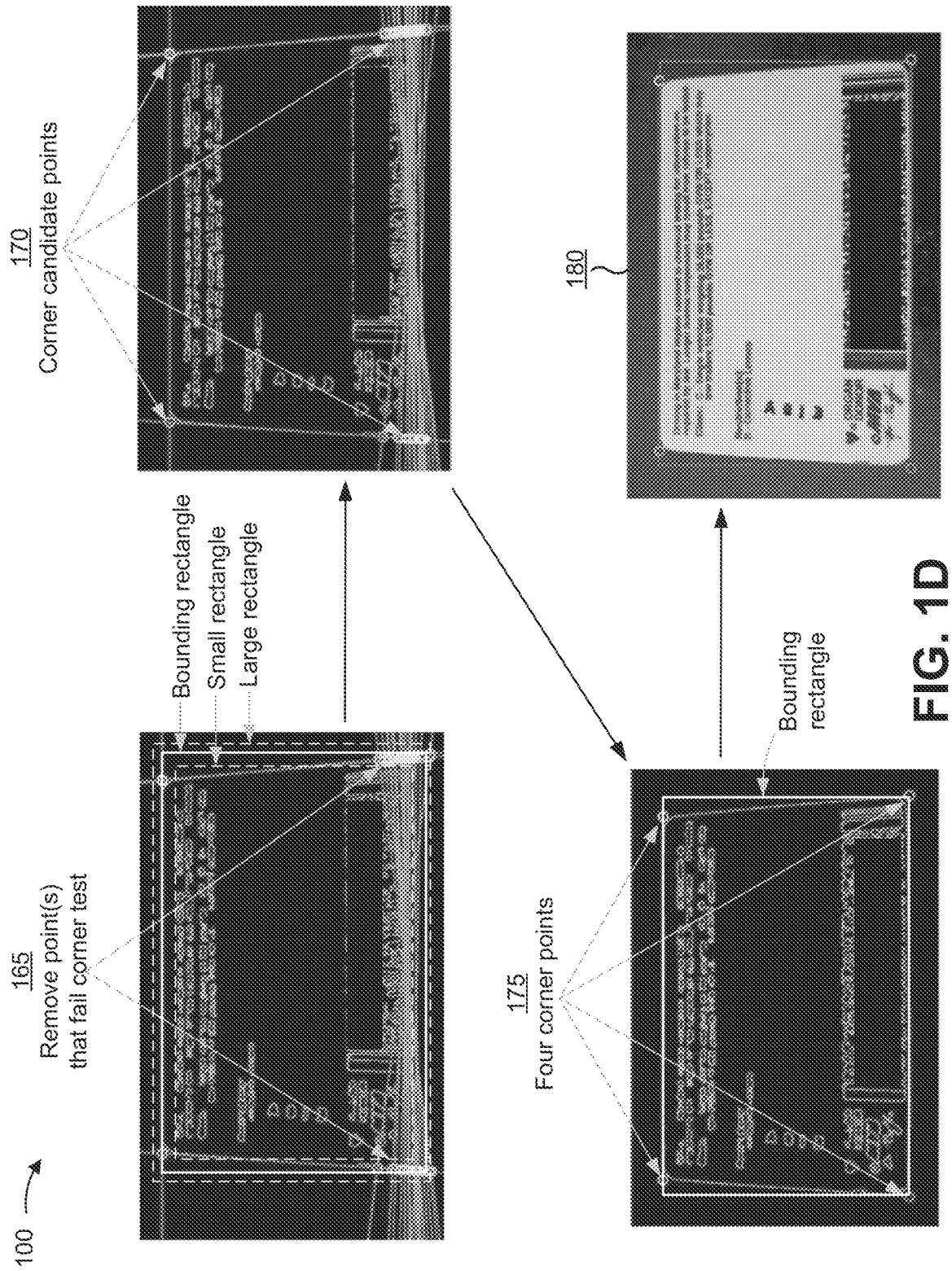

As shown in FIG. 1D, and by reference number 165, the user device may apply one or more point filtering techniques to remove one or more points from the set of intersection points. The one or more points may be removed to generate a set of corner candidate points (e.g., from the remaining set of unremoved points) that are more likely to represent the corners of the document than the removed points. This may improve the accuracy of the captured image of the document, and may conserve processing resources due to needing to process fewer points (e.g., no further processing of the removed points is needed). In some implementations, the user device may use the bounding rectangle to generate the set of corner candidate points.

In some implementations, the user device may remove points that fail a corner test. For example, the user device may generate a first rectangle (shown as "small rectangle") that is smaller than the bounding rectangle and/or that is contained within the bounding rectangle. In some implementations, the size of the first rectangle may be based on the size of the bounding rectangle, such as a percentage of the bounding rectangle (e.g., 75% of the size of the bounding rectangle, or 80%, 85%, 90%, and/or the like). The user device may remove one or more points that are contained within the first rectangle (e.g., that are inside of the first rectangle). In this way, a point that is less likely to correspond to a corner of the document (e.g., because the point is a threshold distance away from a corner of the bounding rectangle, as determined using the first rectangle) may be excluded from the set of corner candidate points.

Additionally, or alternatively, the user device may generate a second rectangle (shown as "large rectangle") that is larger than the bounding rectangle and/or that contains the bounding rectangle. In some implementations, the size of the second rectangle may be based on the size of the bounding rectangle, such as a percentage of the bounding rectangle (e.g., 105% of the size of the bounding rectangle, or 102%, 104%, 108%, and/or the like). The user device may remove one or more points that are not contained within the second rectangle (e.g., that are outside of the second rectangle). In this way, a point that is less likely to correspond to a corner of the document (e.g., because the point is a threshold distance away from a corner of the bounding rectangle, as determined using the second rectangle) may be excluded from the set of corner candidate points.

As shown by reference number 170, after removing one or more points from the set of intersection points, the points remaining in the set may represent a set of corner candidate points. These corner candidate points may be more likely to represent a corner of the document than the points that were removed from the set of points for failing one or more tests.

As shown by reference number 175, the user device may identify four corner points that are included in the set of corner candidate points. The four corner points may be selected as the four points, in the set of corner candidate points, that are closest to the respective four corners of the bounding rectangle. Thus, a first corner point may be selected as the point in the set of corner candidate points that is closest to a first corner of the bounding rectangle, a second corner point may be selected as the point in the set of corner candidate points that is closest to a second corner of the bounding rectangle, a third corner point may be selected as the point in the set of corner candidate points that is closest to a third corner of the bounding rectangle, and a fourth corner point may be selected as the point in the set of corner candidate points that is closest to a fourth corner of the bounding rectangle. As shown by reference number 180, the four corner points may correspond to the corners of the document, which may include one or more rounded corners.

Figure 1E:
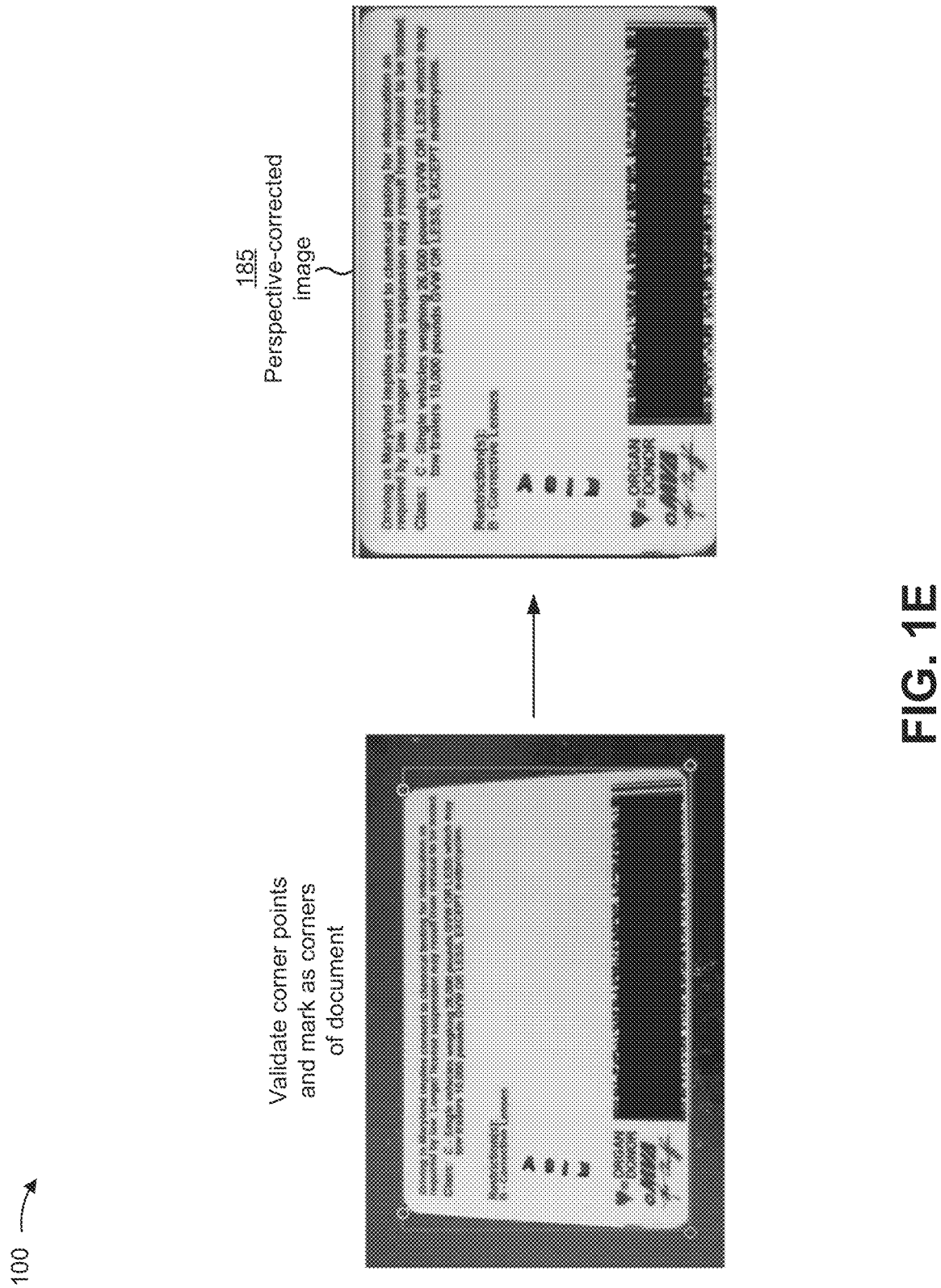

As shown in FIG. 1E, in some implementations, the user device may validate the four corner points. If such validation succeeds, the user device may mark the four corners points as the corners of the document, and may perform perspective correction to crop the document in the image and/or remove a non-document portion of the image. If such validation fails, then the user device may perform a corrective action, such as by selecting one or more different corner points (e.g., a corner points that is second closest to a corner of the bounding rectangle), performing one or more of the techniques described above on a different image of the document (e.g., captured later in time), outputting a prompt for a user to adjust a manner in which the image is captured, and/or the like.

In some implementations, the user device may validate the four corner points by determining that a top edge length, between the two top corner points (e.g., top left and top right), and/or a bottom edge length, between the two bottom corner points (e.g., bottom left and bottom right), is within a threshold size of a width of the bounding rectangle (e.g., within 3%, 5%, 7%, 10%, and/or the like). In some implementations, only one of the top edge length or the bottom edge length must be within the threshold size of the width for the four corner points to be validated. Additionally, or alternatively, different threshold sizes may be used for the top edge length and the bottom edge length (e.g., to account for the document appearing in the image with a tilt, as shown).

Additionally, or alternatively, the user device may validate the four corner points by determining that a left edge length, between the two left corner points (e.g., top left and bottom left), and/or a right edge length, between the two right corner points (e.g., top right and bottom right), is within a threshold size of a height of the bounding rectangle (e.g., within 3%, 5%, 7%, 10%, and/or the like). In some implementations, only one of the left edge length or the right edge length must be within the threshold size of the height for the four corner points to be validated. Additionally, or alternatively, different threshold sizes may be used for the left edge length and the right edge length (e.g., to account for the document appearing in the image with a tilt or skew).

In some implementations, the user device may determine that at least one of the top edge length or the bottom edge length is within a small tolerance threshold (e.g., within 5%) of the width of the bounding rectangle, and/or may determine that at least one of the left edge length or the right edge length is within a small tolerance threshold (e.g., within 5%) of the height of the bounding rectangle. Additionally, or alternatively, the user device may validate that all four edge lengths are within a large tolerance threshold (e.g., within 15%) of corresponding edges of the bounding rectangle.

For example, the user device may validate the four corner points by determining that a top edge length between the two top corner points is within a threshold size (e.g., a second threshold size, such as at least 85%) of the top edge of the bounding rectangle. Similarly, the user device may determine that a bottom edge length between the two bottom corner points is within a threshold size (e.g., 80%, 85%, 90%, and/or the like) of the bottom edge of the bounding rectangle. Additionally, or alternatively, the user device may determine that a left edge length between the two left corner points is within a threshold size (e.g., 80%, 85%, 90%, and/or the like) of the left edge of the bounding rectangle. Similarly, the user device may determine that a right edge length between the two right corner points is within a threshold size (e.g., 80%, 85%, 90%, and/or the like) of the right edge of the bounding rectangle. In this way, the user device may improve accuracy of corner detection and account for errors, and may conserve resources (e.g., processing resources, memory resources, and/or the like) that would otherwise be wasted by using a less accurate technique and/or without accounting for such errors.

As shown by reference number 185, the user device may perform perspective correction on the image of the document using the four corner points (e.g., based on marking the four corner points as the corners of the document). Such perspective correction may include, for example, tilt correction, skew correction, angle correction, rotation correction, and/or the like. By using the techniques described herein, such perspective correction may more accurately detect the edges or contours of the document in the image, may more accurately crop the document in the image, and/or the like, thereby resulting in a more accurate detection of the document in the image, which may be necessary to perform further image processing on the image of the document. Furthermore, resources (e.g., processing resources, memory resources, and/or the like) may be conserved that would otherwise be wasted by using a less accurate technique, which may result in that technique being performed multiple times to obtain an accurate image.

Figure 1F:
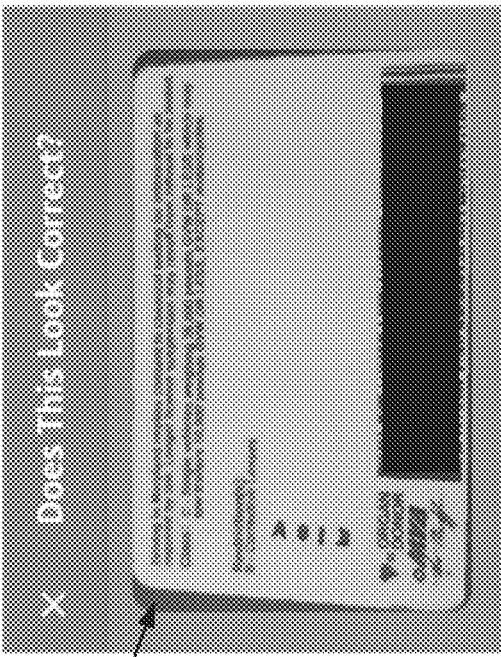
Figure 1F:
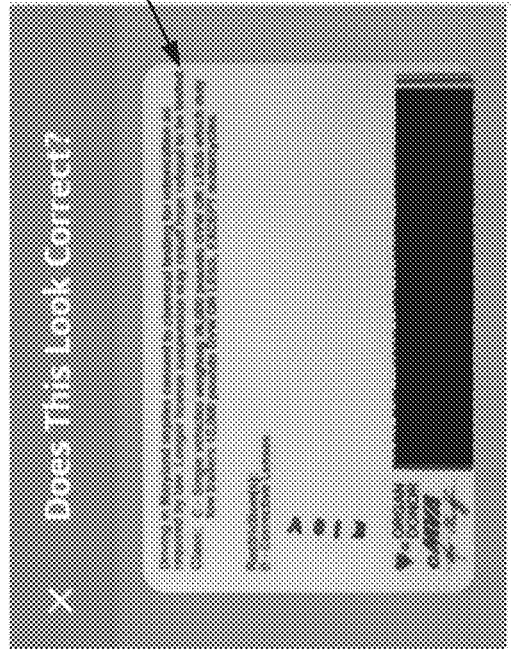

For example, as shown in FIG. 1F, and by reference number 190, applying the techniques described herein may result in more accurate cropping of a document, particularly when the document includes one or more rounded corners (e.g., four rounded corners), when one or more corners of the document are bent or damaged, and/or the like. In some implementations, the user device may auto-capture the image using an image capture component (e.g., a camera) of the user device based on marking the four corner points as corners of the document, validating the four corner points, determining that one or more auto-capture conditions are met, and/or the like. In this way, a user experience may be enhanced, documents may be captured more accurately and efficiently, and/or the like.

In some implementations, the user device (e.g., via an application executing on the user device) may send the processed image (e.g., the auto-captured image, the perspective-corrected image, and/or the like) to a backend platform. The backend platform may process the image. For example, the backend platform may use a computer vision technique to extract data from the image, may verify that the data is accurate (e.g., using a database that includes document-related information), and/or the like. In some implementations, the backend platform may send a message to the user device based on processing the image. For example, the backend platform may send a message to the user device indicating that the data associated with the image is accurate. In some implementations, the backend platform may send information concerning the document, such as accuracy of the document, to the user device.

As indicated above, FIGS. 1A-1F are provided as examples. Other examples are possible and may differ from what was described with regard to FIGS. 1A-1F.

Figure 2:
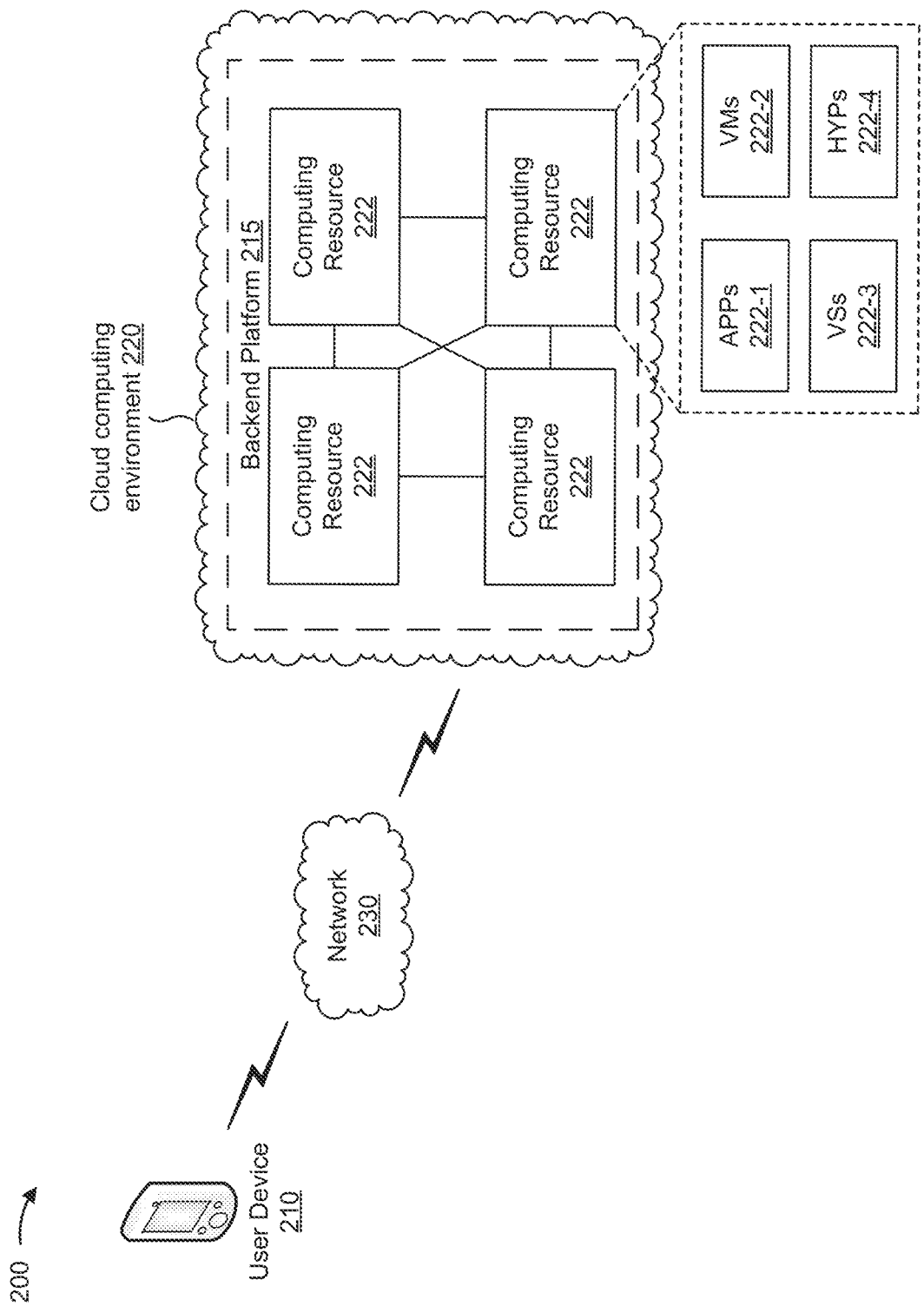
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a backend platform 215, a cloud computing environment 220, and a network 230. Devices of environment 200 may interconnect via wired connections, wireless connections, or a combination of wired and wireless connections.

User device 210 includes one or more devices capable of receiving, generating, storing, processing, and/or providing information associated with images. For example, user device 210 may include a communication and/or computing device, such as a mobile phone (e.g., a smart phone, a radiotelephone, etc.), a desktop computer, a laptop computer, a tablet computer, a handheld computer, a gaming device, a device integrated within a vehicle, a wearable communication device (e.g., a smart wristwatch, a pair of smart eyeglasses, etc.), a scanner, a camera, a camcorder, or a similar type of device. In some implementations, user device 210 may include an image capture component (e.g., a camera, a video camera, and/or the like) for facilitating the capture of high-resolution images.

Backend platform 215 includes one or more devices capable of receiving, generating, storing, processing, and/or providing information associated with images. Backend platform 215 may include a server device or a group of server devices. In some implementations, as shown, backend platform 215 can be hosted in cloud computing environment 220. Notably, while implementations, described herein, describe backend platform 215 as being hosted in cloud computing environment 220, in some implementations, backend platform 215 is not cloud-based or can be partially cloud-based. In some implementations, backend platform 215 may receive, from user device 210, high-resolution images and/or information regarding captured images, as described elsewhere herein.

Cloud computing environment 220 includes an environment that delivers computing as a service, whereby shared resources, services, etc. can be provided to user device 210 and/or one or more other backend platforms 215. Cloud computing environment 220 can provide computation, software, data access, storage, and/or other services that do not require end-user knowledge of a physical location and configuration of a system and/or a device that delivers the services. As shown, cloud computing environment 220 can include a set of computing resources 222.

Computing resource 222 includes one or more personal computers, workstation computers, server devices, or another type of computation and/or communication device. In some implementations, computing resource 222 can host backend platform 215. The cloud resources can include compute instances executing in computing resource 222, storage devices provided in computing resource 222, data transfer devices provided by computing resource 222, etc. In some implementations, computing resource 222 can communicate with other computing resources 222 via wired connections, wireless connections, or a combination of wired and wireless connections.

As further shown in FIG. 2, computing resource 222 can include a group of cloud resources, such as one or more applications ("APPs") 222-1, one or more virtual machines ("VMs") 222-2, virtualized storage ("VSs") 222-3, one or more hypervisors ("HYPs") 222-4, and/or the like.

Application 222-1 includes one or more software applications that can be provided to or accessed by user device 210. Application 222-1 can eliminate a need to install and execute the software applications on user device 210. For example, application 222-1 can include software associated with backend platform 215 and/or any other software capable of being provided via cloud computing environment 220. In some implementations, one application 222-1 can send/receive information to/from one or more other applications 222-1, via virtual machine 222-2.

Virtual machine 222-2 includes a software implementation of a machine (e.g., a computer) that executes programs like a physical machine. Virtual machine 222-2 can be either a system virtual machine or a process virtual machine, depending upon use and degree of correspondence to any real machine by virtual machine 222-2. A system virtual machine can provide a complete system platform that supports execution of a complete operating system (OS). A process virtual machine can execute a single program, and can support a single process. In some implementations, virtual machine 222-2 can execute on behalf of a user (e.g., user device 210) and/or on behalf of one or more other backend platforms 215, and can manage infrastructure of cloud computing environment 220, such as data management, synchronization, or long-duration data transfers.

Virtualized storage 222-3 includes one or more storage systems and/or one or more devices that use virtualization techniques within the storage systems or devices of computing resource 222. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 222-4 provides hardware virtualization techniques that allow multiple operating systems (e.g., "guest operating systems") to execute concurrently on a host computer, such as computing resource 222. Hypervisor 222-4 can present a virtual operating platform to the guest operating systems, and can manage the execution of the guest operating systems. Multiple instances of a variety of operating systems can share virtualized hardware resources.

Network 230 includes one or more wired and/or wireless networks. For example, network 230 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
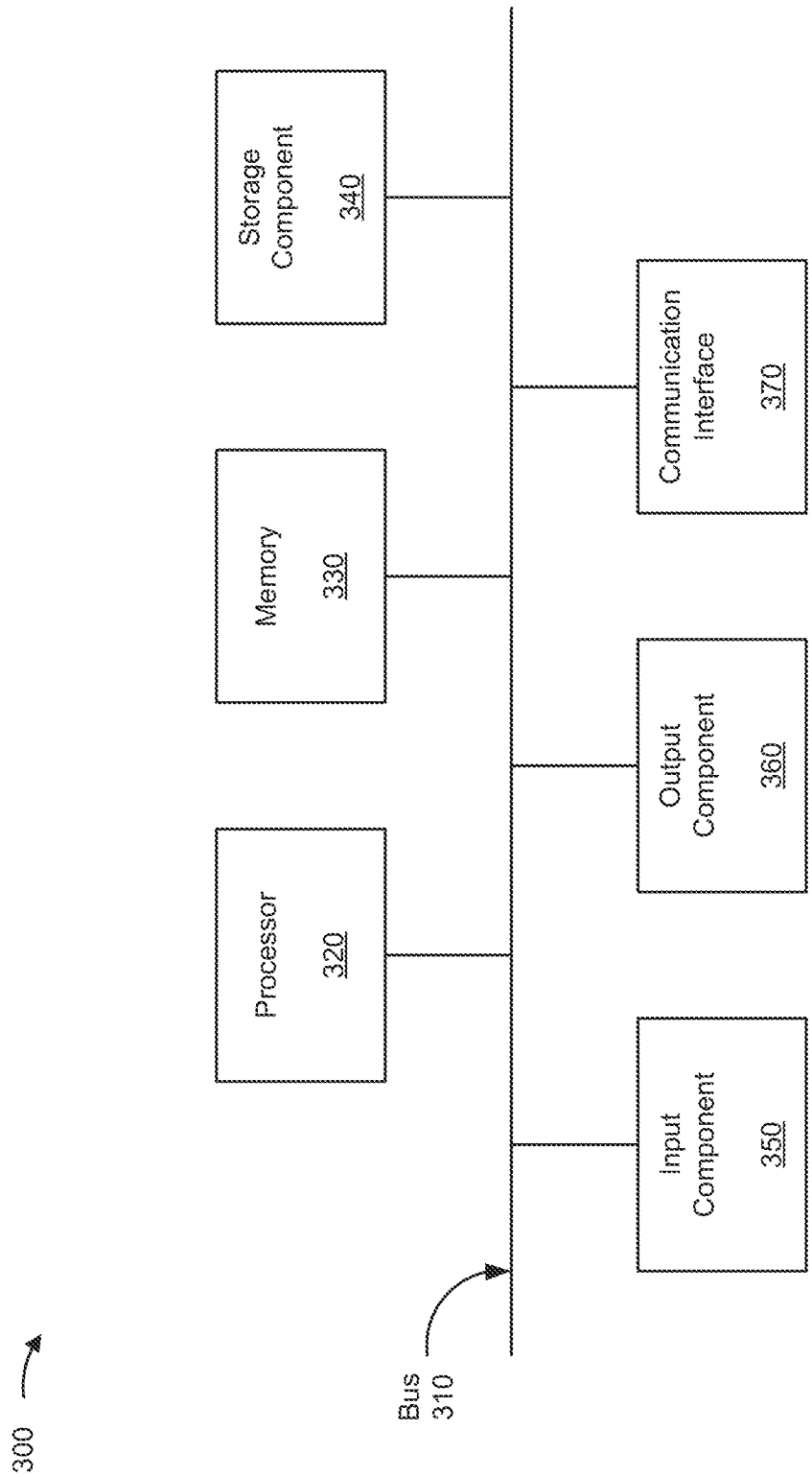
FIG. 3 is a diagram of example components of one or more devices of FIG. 2.

FIG. 3 is a diagram of example components of a device 300. Device 300 may correspond to user device 210, backend platform 215, and/or computing resource 222. In some implementations, user device 210, backend platform 215, and/or computing resource 222 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a camera, a video camera, an image capture component, a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
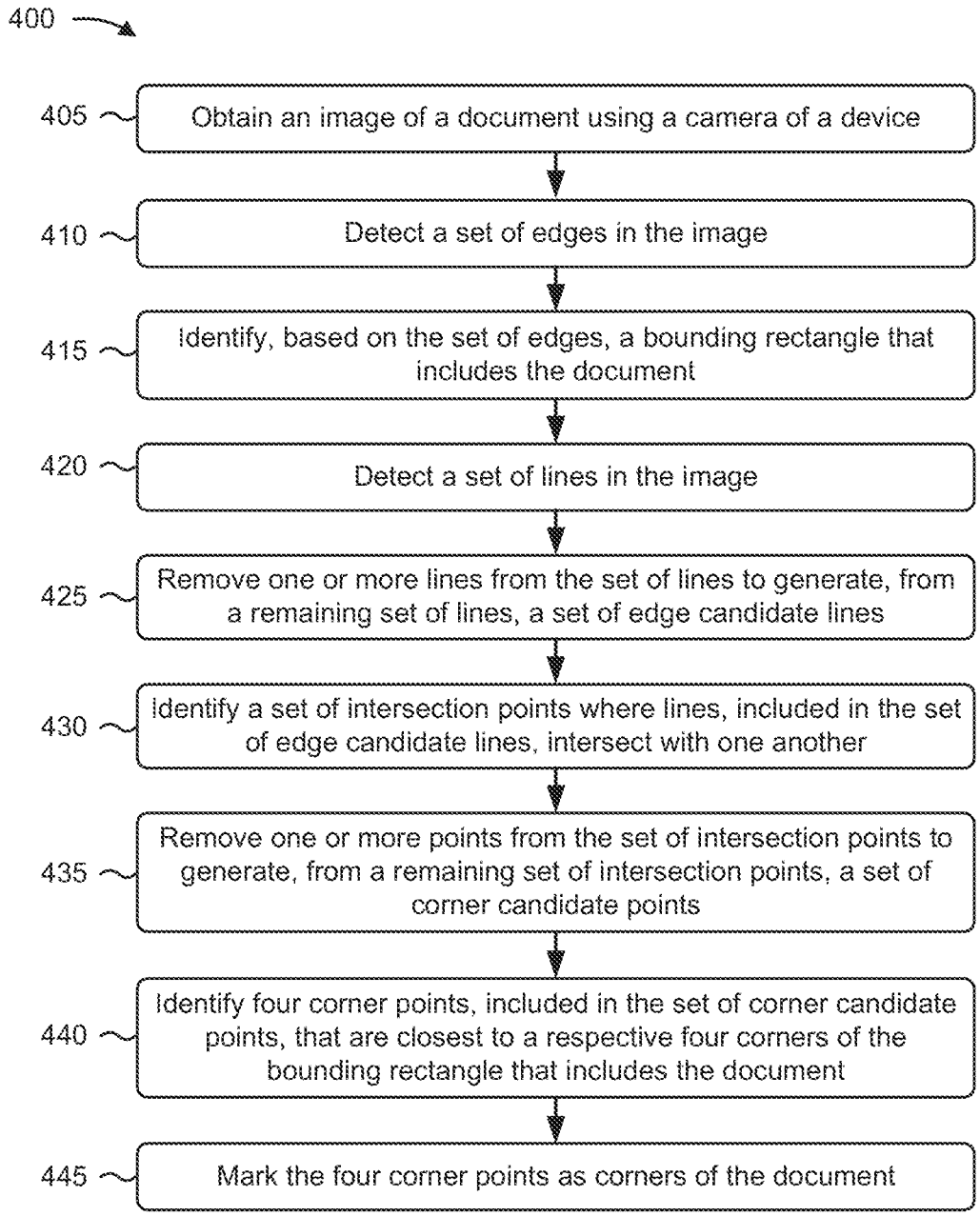

FIG. 4 is a flow chart of an example process 400 for image processing to detect a rectangular object. In some implementations, one or more process blocks of FIG. 4 may be performed by a user device (e.g., user device 210). In some implementations, one or more process blocks of FIG. 4 may be performed by another device or a group of devices separate from or including the user device, such as a backend platform (e.g., backend platform 215).

As shown in FIG. 4, process 400 may include obtaining an image of a document using a camera of a device (block 405). For example, the user device (e.g., using an image capture component, a camera, processor 320, input component 350, and/or the like) may obtain an image of a document, as described above.

As further shown in FIG. 4, process 400 may include detecting a set of edges in the image (block 410). For example, the user device (e.g., using processor 320, input component 350, and/or the like) may detecting a set of edges in the image, as described above.

As further shown in FIG. 4, process 400 may include identifying, based on the set of edges, a bounding rectangle that includes the document (block 415). For example, the user device (e.g., using processor 320, input component 350, and/or the like) may identify a bounding rectangle that includes the document, as described above. In some implementations, the user device may identify the bounding rectangle based on the set of edges.

As further shown in FIG. 4, process 400 may include detecting a set of lines in the image (block 420). For example, the user device (e.g., using processor 320, input component 350, and/or the like) may detect a set of lines in the image, as described above.

As further shown in FIG. 4, process 400 may include removing one or more lines from the set of lines to generate, from a remaining set of lines, a set of edge candidate lines (block 425). For example, the user device (e.g., using processor 320, input component 350, and/or the like) may remove one or more lines from the set of lines, as described above. In some implementations, this removal may form, from the set of remaining lines, a set of edge candidate lines.

As further shown in FIG. 4, process 400 may include identifying a set of intersection points where lines, included in the set of edge candidate lines, intersect with one another (block 430). For example, the user device (e.g., using processor 320, input component 350, and/or the like) may identify a set of intersection points, as described above. The set of intersection points may be points where lines, included in the set of edge candidate lines, intersect with one another As further shown in FIG. 4, process 400 may include removing one or more points from the set of intersection points to generate, from a remaining set of intersection points, a set of corner candidate points (block 435). For example, the user device (e.g., using processor 320, input component 350, and/or the like) may remove one or more points from the set of intersection points, as described above. In some implementations, this removal may form, from the set of remaining intersection points, a set of corner candidate points.

As further shown in FIG. 4, process 400 may include identifying four corner points, included in the set of corner candidate points, that are closest to a respective four corners of the bounding rectangle that includes the document (block 440). For example, the user device (e.g., using processor 320, input component 350, and/or the like) may identify four corner points, included in the set of corner candidate points, that are closest to a respective four corners of the bounding rectangle that includes the document, as described above.

As further shown in FIG. 4, process 400 may include marking the four corner points as corners of the document (block 445). For example, the user device (e.g., using processor 320, input component 350, and/or the like) may mark the four corner points as corners of the document, as described above.

Process 400 may include additional implementations, such as any single implementation or any combination of implementations described below and/or in connection with one or more other processes described elsewhere herein.

In some implementations, the user device may convert the image to a grayscale image, and may generate a blurred image based on the grayscale image. The user device may detect the set of edges in the image by detecting the set of edges in the blurred image. The user device may detect the set of lines in the image by detecting the set of lines in the blurred image.

In some implementations, the user device may perform perspective correction on the image of the document based on marking the four corner points as corners of the document. In some implementations, the user device may remove the one or more lines from the set of lines by generating a first midpoint line that connects midpoints of a first pair of opposite edges of the bounding rectangle, generating a second midpoint line that connects midpoints of a second pair of opposite edges of the bounding rectangle, and removing the one or more lines that are not within a threshold angle of the first midpoint line or the second midpoint line. In some implementations, removing the one or more lines from the set of lines includes removing the one or more lines with respective midpoints that are not within a threshold distance of a midpoint of an edge of the bounding rectangle.

In some implementations, removing the one or more points from the set of intersection points includes generating a rectangle that is smaller than the bounding rectangle and that is contained within the bounding rectangle; and removing the one or more points that are contained within the rectangle. In some implementations, removing the one or more points from the set of intersection points includes generating a rectangle that is larger than the bounding rectangle and that contains the bounding rectangle; and removing the one or more points that are not contained within the rectangle.

In some implementations, the user device may validate the four corner points before marking the four corner points as the corners of the document. In some implementations, validating the four corner points includes determining that a top edge length between two top corner points, of the four corner points, or a bottom edge length between two bottom corner points, of the four corner points, is within a threshold size of a width of the bounding rectangle. In some implementations, validating the four corner points includes determining that a left edge length between two left corner points, of the four corner points, or a right edge length between two right corner points, of the four corner points, is within a threshold size of a height of the bounding rectangle. In some implementations, validating the four corner points includes determining that a top edge length between two top corner points, of the four corner points, and a bottom edge length between two bottom corner points, of the four corner points, is within a threshold size of a width of the bounding rectangle; and determining that a left edge length between two left corner points, of the four corner points, and a right edge length between two right corner points, of the four corner points, is within a threshold size of a height of the bounding rectangle.

In some implementations, the user device may auto-capture the image using the camera of the device based on marking the four corner points as corners of the document and determining that one or more auto-capture conditions are met.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
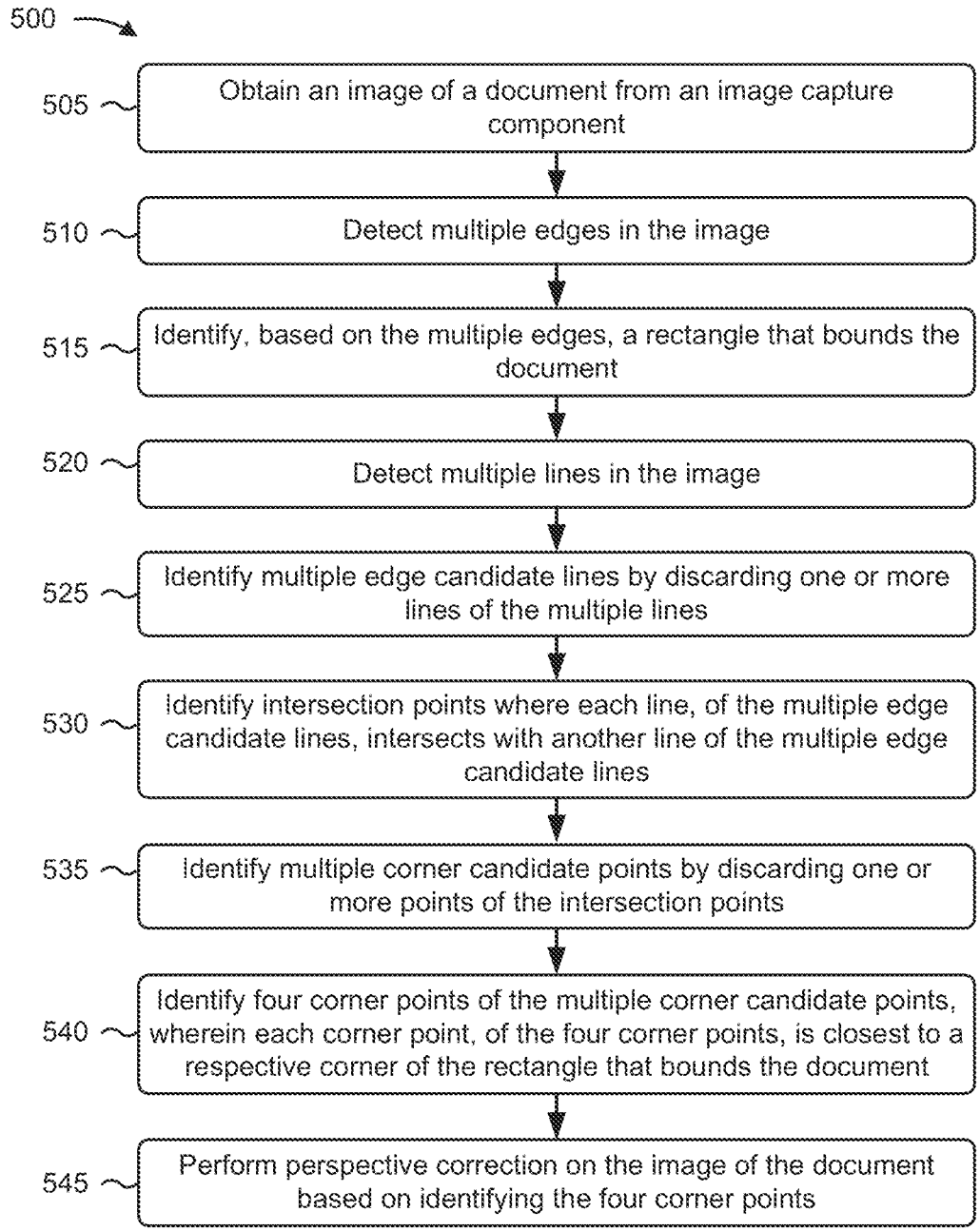

FIG. 5 is a flow chart of an example process 500 for image processing to detect a rectangular object. In some implementations, one or more process blocks of FIG. 5 may be performed by a user device (e.g., user device 210). In some implementations, one or more process blocks of FIG. 5 may be performed by another device or a group of devices separate from or including the user device, such as a backend platform (e.g., backend platform 215).

As shown in FIG. 5, process 500 may include obtaining an image of a document from an image capture component (block 505). For example, the user device (e.g., using an image capture component, a camera, processor 320, input component 350, and/or the like) may obtain an image of a document, as described above.

As further shown in FIG. 5, process 500 may include detecting multiple edges in the image (block 510). For example, the user device (e.g., using processor 320, input component 350, and/or the like) may detecting multiple edges in the image, as described above.

As further shown in FIG. 5, process 500 may include identifying, based on the multiple edges, a rectangle that bounds the document (block 515). For example, the user device (e.g., using processor 320, input component 350, and/or the like) may identify a rectangle that bounds the document, as described above. In some implementations, the user device may identify the rectangle based on the multiple edges.

As further shown in FIG. 5, process 500 may include detecting multiple lines in the image (block 520). For example, the user device (e.g., using processor 320, input component 350, and/or the like) may detect multiple lines in the image, as described above.

As further shown in FIG. 5, process 500 may include identifying multiple edge candidate lines by discarding one or more lines of the multiple lines (block 525). For example, the user device (e.g., using processor 320, input component 350, and/or the like) identify multiple edge candidate lines by discarding one or more lines of the multiple lines, as described above.

As further shown in FIG. 5, process 500 may include identifying intersection points where each line, of the multiple edge candidate lines, intersects with another line of the multiple edge candidate lines (block 530). For example, the user device (e.g., using processor 320, input component 350, and/or the like) may identify intersection points where each line, of the multiple edge candidate lines, intersects with another line of the multiple edge candidate lines, as described above.

As further shown in FIG. 5, process 500 may include identifying multiple corner candidate points by discarding one or more points of the intersection points (block 535). For example, the user device (e.g., using processor 320, input component 350, and/or the like) may identify multiple corner candidate points by discarding one or more points of the intersection points, as described above.

As further shown in FIG. 5, process 500 may include identifying four corner points of the multiple corner candidate points, wherein each corner point, of the four corner points, is closest to a respective corner of the rectangle that bounds the document (block 540). For example, the user device (e.g., using processor 320, input component 350, and/or the like) may identify four corner points of the multiple corner candidate points, as described above. In some implementations, each corner point, of the four corner points, is closest to a respective corner of the rectangle that bounds the document.

As further shown in FIG. 5, process 500 may include performing perspective correction on the image of the document based on identifying the four corner points (block 545). For example, the user device (e.g., using processor 320, input component 350, and/or the like) may perform perspective correction on the image of the document based on identifying the four corner points, as described above.

Process 500 may include additional implementations, such as any single implementation or any combination of implementations described below and/or in connection with one or more other processes described elsewhere herein.

In some implementations, the document has at least one rounded corner, and wherein at least one corner point, of the four corner points, corresponds to the at least one rounded corner. In some implementations, identifying the multiple edge candidate lines by discarding the one or more lines includes generating a first midpoint line that connects midpoints of a first pair of opposite edges of the rectangle; generating a second midpoint line that connects midpoints of a second pair of opposite edges of the rectangle; discarding a first set of lines that are not within a threshold angle of the first midpoint line or the second midpoint line; and discarding a second set of lines with midpoints that are not within a threshold distance of a midpoint of an edge of the rectangle.

In some implementations, identifying the multiple corner candidate points by discarding the one or more points includes generating a first rectangle that is smaller than the rectangle that bounds the document and that is contained within the rectangle that bounds the document; discarding a first set of points that are contained within the first rectangle; generating a second rectangle that is larger than the rectangle that bounds the document and that contains the rectangle that bounds the document; and discarding a second set of points that are not contained within the second rectangle.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for image processing to detect a rectangular object. In some implementations, one or more process blocks of FIG. 6 may be performed by a user device (e.g., user device 210). In some implementations, one or more process blocks of FIG. 6 may be performed by another device or a group of devices separate from or including the user device, such as a backend platform (e.g., backend platform 215).

As shown in FIG. 6, process 600 may include detecting a set of edges in a processed image generated from an image of a document captured by a device (block 605). For example, the user device (e.g., using an image capture component, a camera, processor 320, input component 350, and/or the like) may detect a set of edges in a processed image generated from an image of a document captured by the device, as described above.

As further shown in FIG. 6, process 600 may include identifying, based on the set of edges, a bounding rectangle that bounds the document (block 610). For example, the user device (e.g., using processor 320, input component 350, and/or the like) may identify a bounding rectangle that bounds the document, as described above. In some implementations, the user device may identify the bounding rectangle based on the set of edges.

As further shown in FIG. 6, process 600 may include identifying a set of edge candidate lines in the processed image (block 615). For example, the user device (e.g., using processor 320, input component 350, and/or the like) may identify a set of edge candidate lines in the processed image, as described above.

As further shown in FIG. 6, process 600 may include identifying a set of intersection points where each line, included in the set of edge candidate lines, intersects with another line included in the set of edge candidate lines (block 620). For example, the user device (e.g., using processor 320, input component 350, and/or the like) may identify a set of intersection points where each line, included in the set of edge candidate lines, intersects with another line included in the set of edge candidate lines, as described above.

As further shown in FIG. 6, process 600 may include identifying a set of corner candidate points by discarding one or more points included in the set of intersection points (block 625). For example, the user device (e.g., using processor 320, input component 350, and/or the like) may identify a set of corner candidate points by discarding one or more points included in the set of intersection points, as described above.

As further shown in FIG. 6, process 600 may include identifying a corner point included in the set of corner candidate points, wherein the corner point is a point, included in the set of corner candidate points, that is closest to one corner of the bounding rectangle (block 630). For example, the user device (e.g., using processor 320, input component 350, and/or the like) may identify a corner point included in the set of corner candidate points, as described above. In some implementations, the corner point is a point, included in the set of corner candidate points, that is closest to one corner of the bounding rectangle.

As further shown in FIG. 6, process 600 may include performing perspective correction on the image of the document based on identifying the corner point (block 635). For example, the user device (e.g., using processor 320, input component 350, and/or the like) may perform perspective correction on the image of the document based on identifying the corner point, as described above.

Process 600 may include additional implementations, such as any single implementation or any combination of implementations described below and/or in connection with one or more other processes described elsewhere herein.

In some implementations, the document has a rounded or damaged corner, and wherein the corner point corresponds to the rounded or damaged corner. In some implementations, identifying the set of edge candidate lines includes detecting a set of lines in the process image; and identifying the set of edge candidate lines by discarding one or more lines included in the set of lines. In some implementations, discarding the one or more lines includes generating a first midpoint line that connects midpoints of a first pair of opposite edges of the rectangle; generating a second midpoint line that connects midpoints of a second pair of opposite edges of the rectangle; and discarding at least one of: a first set of lines that are not within a threshold angle of the first midpoint line or the second midpoint line, or a second set of lines with midpoints that are not within a threshold distance of a first intersection between the first midpoint line and a first edge line of the bounding rectangle or a second intersection between the second midpoint line and a second edge line of the bounding rectangle.

In some implementation identifying the set of corner candidate points by discarding the one or more points includes discarding at least one of: a first set of points that are contained within a first rectangle that is contained within the bounding rectangle, or a second set of points that are not contained within a second rectangle that contains the bounding rectangle.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   identifying, by a device, a bounding shape that bounds a representation of an object depicted in an image, the bounding shape comprising a set of corners;
   identifying, by the device, a set of intersection points where lines, included in a set of edge candidate lines, intersect with one another in the image;
   generating, by the device, a set of corner candidate points using a second shape of a different size than the bounding shape to remove one or more points from the set of intersection points; and
   identifying, by the device, corner points, included in the set of corner candidate points, that are closest, respectively, to the set of corners of the bounding shape.

2. The method of claim 1, wherein the bounding shape comprises a bounding rectangle.

3. The method of claim 2, wherein the second shape comprises an inner rectangle having dimensions smaller than the bounding rectangle; and
   wherein removing the one or more points from the set of intersection points comprises:
      removing at least one point, of the one or more points, that are contained within the inner rectangle.

4. The method of claim 2, wherein the second shape comprises an outer rectangle having dimensions larger than the bounding rectangle; and
   wherein removing the one or more points from the set of intersection points comprises:
      removing at least one point, of the one or more points, that are contained outside the outer rectangle.

5. The method of claim 2, further comprising:
   validating the corner points by determining that an edge length, between two of the corner points, is within a threshold size of the bounding rectangle.

6. The method of claim 1, further comprising:
performing perspective correction on the image using the corner points.

7. The method of claim 1, wherein the object includes a document having a plurality of rounded corners, and
wherein the corner points correspond to the plurality of rounded corners.

8. The method of claim 1, wherein the image is one of an identification card, an insurance card, a transaction card, or a check.

9. A device, comprising:
one or more processors configured to:
identify a first bounding shape that bounds a representation of a document depicted in an image, the first bounding shape comprising a set of corners;
identify a set of intersection points where lines, included in a set of edge candidate lines, intersect with one another in the image;
generate a set of corner candidate points using a second shape, distinct and separate from the first bounding shape, to remove one or more points from the set of intersection points; and
identify corner points, included in the set of corner candidate points, that are closest, respectively, to the corners of the first bounding shape.

10. The device of claim 9, wherein the first bounding shape comprises a bounding rectangle.

11. The device of claim 10, wherein the second shape comprises an inner rectangle having dimensions smaller than the bounding rectangle; and
wherein the one or more processors, to remove the one or more points from the set of intersection points, are configured to:
remove at least one point, of the one or more points, that are contained within the inner rectangle.

12. The device of claim 10, wherein the second shape comprises an outer rectangle having dimensions larger than the bounding rectangle; and
wherein the one or more processors, to remove the one or more points from the set of intersection points, are configured to:
remove at least one point, of the one or more points, that are contained outside the outer rectangle.

13. The device of claim 10, wherein the one or more processors are further configured to:
validate the corner points by determining that an edge length, between two of the corner points, is within a threshold size of the bounding rectangle.

14. The device of claim 9, wherein the document is one of an identification card, an insurance card, a transaction card, or a check.

15. A non-transitory computer-readable medium storing a set of instructions, the set of instructions comprising:
one or more instructions that, when executed by one or more processors of a device, cause the device to:
identify a first bounding shape that bounds a representation of an object depicted in an image;
identify a set of intersection points where lines intersect with one another in the image;
generate a set of corner candidate points using a second shape to remove one or more points from the set of intersection points; and
identify corner points, included in the set of corner candidate points, that are closest, respectively, to the corners of the first bounding shape.

16. The non-transitory computer-readable medium of claim 15, wherein the first bounding shape comprises a bounding rectangle.

17. The non-transitory computer-readable medium of claim 16, wherein the second shape comprises an inner rectangle having dimensions smaller than the bounding rectangle; and
wherein the one or more instructions, that cause the device to remove the one or more points from the set of intersection points, cause the device to:
remove at least one point, of the one or more points, that are contained within the inner rectangle.

18. The non-transitory computer-readable medium of claim 16, wherein the second shape comprises an outer rectangle having dimensions larger than the bounding rectangle; and
wherein the one or more instructions, that cause the device to remove the one or more points from the set of intersection points, cause the device to:
remove at least one point, of the one or more points, that are contained outside the outer rectangle.

19. The non-transitory computer-readable medium of claim 16, wherein the one or more instructions further cause the device to:
validate the corner points by determining that an edge length, between two of the corner points, is within a threshold size of the bounding rectangle.

20. The non-transitory computer-readable medium of claim 16, wherein the image is one of an identification card, an insurance card, a transaction card, or a check.

* * * * *